Oct. 12, 1965    G. P. BENTLEY ETAL    3,210,894
METHOD OF PRODUCING ASPHERIC SURFACES ON MIRRORS OR LENSES
Filed Aug. 13, 1962

INVENTORS:
GEORGE P. BENTLEY
GERALD H. LOVINS
BY
THEIR ATTORNEYS 3,210,894
METHOD OF PRODUCING ASPHERIC SURFACES ON MIRRORS OR LENSES
George P. Bentley, Franklin, and Gerald H. Lovins, Amherst, Mass., assignors to Kollmorgen Corporation, Northampton, Mass., a corporation of New York
Filed Aug. 13, 1962, Ser. No. 216,459
13 Claims. (Cl. 51—284)

This invention relates to the production of aspherical surfaces on optical elements such as lenses, mirrors and the like and, more particularly, to methods and apparatuses for producing aspheric optical surfaces by a generating operation.

Optical science and the optical industry are presently confined to the capabilities and limitations of generating grinders and polishers to six fundamental spherical optical surfaces; biconvex, plano-convex, concavo-convex, biconcave, plano-concave and convexo-concave. The limited potential of the six basic spherical shapes, as opposed to the widely varied optical needs of mankind, have created technical problems which in many cases can be solved, if at all, by combinations of the fundamental optical surface shapes resorting, where necessary, to such devices as immersed lenses or lens glass combinations of different refractive indices or to manual grinding and polishing by only the most highly skilled artisans.

Optical systems limited to spherically generated surfaces are subject to imperfections. Among the more common imperfections characteristic of spherical optical surfaces are spherical aberration, chromatic aberration, astigmatism, distortion and curvature of field.

Moreover, a number of potentially valuable optical systems cannot be produced with spherically ground lenses. For example, a wide field angle lens is incompatible with a large aperture and aplanatic lenses of large aperture cannot be orthoscopic.

The present invention overcomes these disadvantages and limitations by providing a mass production method and apparatus for the generation of aspherical lenses of uniform quality. The invention thus frees optical science and the optical industry from the limitations imposed by spherical optical surfaces.

More particularly, the invention involves applying pressure to an optical blank to flex, bend or otherwise deform it, and while the blank is temporarily deformed it is regenerated with conventional grinding means to form a spherical surface on one or both sides of it. After grinding is completed, the blank is relieved of pressure. The optical blank, ground spherically while distorted out of its natural shape, upon relief of the pressure, returns to an undeformed condition, converting the spherical surface or surfaces to an aspherical surface or surfaces.

This invention may be applied to the production of aspherical surfaces on products other than optical products, for example, flexible metal diaphragms, plastics and the like.

For a better understanding of the present invention reference may be had to the accompanying drawings in which.

Figure 1:
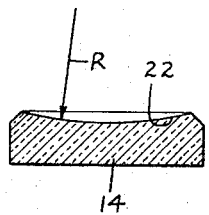
FIGURE 1 is a view in section of an optical blank having a concave spherical surface.
Figure 2:
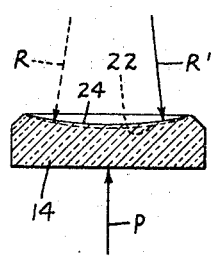
FIGURE 2 is a view in section of the optical blank during spherical regeneration under temporary stress distortion according to one embodiment of the present invention.
Figure 4:
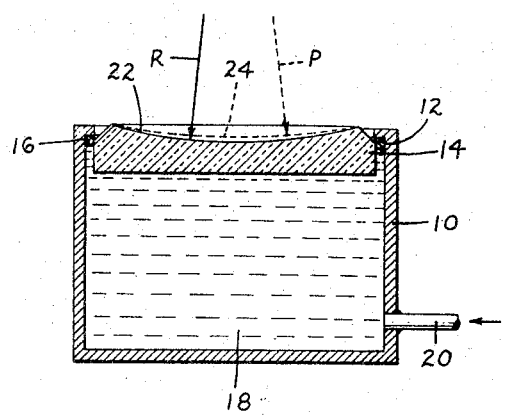
FIGURE 4 is a view in section of an apparatus for practicing the invention.

As shown in FIGURE 4, a pressure vessel 10 is fitted with an aperture 12 of a size suitable to accommodate a lens blank 14 such as a plano-concave lens blank or a concave mirror blank, and a seal 16. A pressurizing medium 18 such as gas or liquid can be introduced into the pressure vessel 10 through a pressure line 20. The optical blank or work piece 14 having a concave surface 22 ground on radius R, is placed against the pressure seal 16 in the pressure vessel 10. The pressure within the pressure vessel 10 in which the lens 14 is mounted is increased to distort the spherical surface 22 of the lens 14 to the non-spherical surface indicated by the line 24. Conventional generating lens grinding machinery (not shown) regenerates the distorted surface 22 of the optical blank 14 to a spherical shape on the radius R′ as shown in FIGURE 2 while the blank is distorted.

Figure 3:
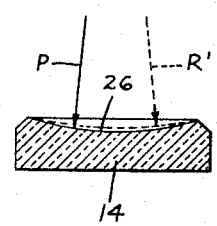
FIGURE 3 is a view in section of the optical blank after spherical regeneration and stress relief.

On relieving the pressure within the vessel 10, the optical blank 14 returns to its initial undistorted shape and the surface 22 assumes a permanent aspherical shape described by the variable radius of curvature P of FIGURE 3. The particular aspherical shape is determined by the radii of spherical generation and regeneration, and the amount of distortion of the blank during regeneration.

Figure 5:
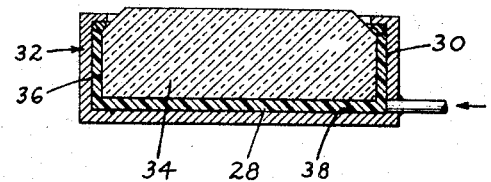
FIGURE 5 is a view in section of another apparatus for practicing the invention.
Figure 6:
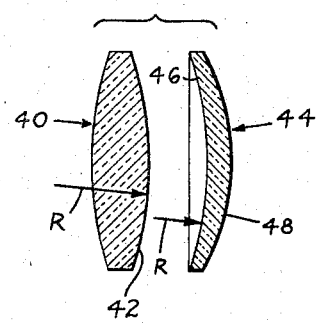
FIGURE 6 is an exploded view in section of another form of optical device having an aspherical surface in accordance with the invention.

As shown in FIGURE 5, it is not necessary for the pressurizing means or medium to be a gas or fluid. A low-melting metal or resinous material for example a fluid epoxy resin 28 containing a hardener or catalyst may be introduced under pressure into a chamber 30 within a leak-tight vessel 32, in which an optical blank 34 is mounted to bend or distort the blank. The hardener or catalyst causes the resin medium 28, to solidify and thereby retain the optical blank 34 in its distorted shape thereby preventing flexing of the blank during regeneration.

The hardened resin 28 can be removed from the blank 34 after regeneration is completed by grinding or, if its surface 36 has been suitably treated, as for example, with oil, grease, a silicone or the like before deformation, the solid layer of resin can be peeled readily from the blank.

Figure 7:
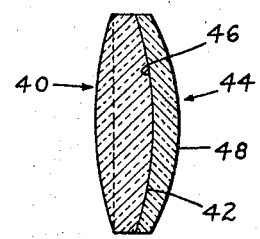
FIGURE 7 is a view in section of the lens shown in FIGURE 6 in assembled condition.

A further embodiment of this invention enables aspherical surfaces to be generated on thick lenses which are not readily deformable by pressurizing means. One component of the lens includes a thick lens element 40 having a spherical surface 42, ground to the radius R. A thin lens element 44 is provided with a concave surface 46 complemental to the surface 42 and a convex aspherical surface or side 48 which has been produced, as described above, by deforming the lens element 44, spherically generating the surface 48 and then releasing the lens element of pressure. The matching surfaces or sides 42 and 46 are placed in contact as shown in FIGURE 7, providing a lens with an aspherical surface 48.

It is of course, understood that this technique is not limited in application to lenses, but may be applied to the production of any optical surface. Furthermore, the two contacting surfaces 42 and 46 could be flat, that is, spherically ground with an infinite radius, R.

Many variations of this method and apparatus are possible. For example, the blank may have initially flat surfaces which can be ground concavely or convexly while the blank is deformed. Grinding apparatus can be located on either or both sides of the optical blank and with the generating apparatus inside or outside of the pressure vessel. The blank can be deformed non-uniformly by localized unequal flexing arising from variations in the thickness of the blank. Moreover, deformation can be produced by utilizing a reduced pressure on one side of the blank and a superatmospheric pressure on the opposite side thereof.

It will be understood from the foregoing, that the present invention provides methods and apparatus which enable the ready manufacture by a generating operation of aspherical lenses and other optical surfaces and thereby renders the mass production of aspherical optical elements possible.

While representative embodiments of the present invention have been shown and described for purposes of illustration, various changes and modifications may be made therein as pointed out above without departing from the principles of this invention. Therefore, all such changes and modifications are included within the intended scope of the invention as defined by the following claims.

We claim:

1. A method of producing aspherical surfaces on articles comprising applying fluid pressure to an article to flex and deform it, generating a curved surface on said article while it is flexed and deformed and thereafter restoring said article to an unflexed and undeformed state.

2. The method of producing aspherical surfaces set forth in claim 1 in which said article has areas of different thicknesses and is flexed and deformed non-uniformly.

3. The method of producing aspherical surfaces set forth in claim 1 in which the said articles are lenses.

4. The method of producing aspherical surfaces set forth in claim 1 in which the said articles are mirrors.

5. A method of producing aspherical surfaces on articles comprising applying fluid pressure to an article provided initially with at least one convex surface, to flex and deform said surface, generating a curved surface on said initially convex surface while it is flexed and deformed and thereafter restoring said article to an unflexed and undeformed state.

6. A method of producing aspherical surfaces on articles comprising applying fluid pressure to an article provided initially with at least one concave surface to flex and deform said surface, generating a curved surface on said initially concave surface while it is flexed and deformed and thereafter restoring said article to an unflexed and undeformed state.

7. A method of manufacturing optical products comprising applying fluid pressure to a first lens element to deform it, generating a surface on said lens element and relieving said lens element of pressure whereupon the said first lens element is mounted on a second lens element thus forming a lens.

8. A method of producing aspherical surfaces on articles comprising forcing a liquid under pressure against one side of an optical element to flex said element, converting said liquid to a solid while said element is flexed, generating a curved surface on said element while it is flexed, and thereafter separating said element from said solid and restoring said element to an unflexed state.

9. A method of producing aspherical surfaces on articles according to claim 8 wherein said liquid is a molten low melting metal.

10. A method of producing aspherical surfaces on articles according to claim 8 wherein said liquid is a hardenable synthetic resin.

11. A method of producing aspherical surfaces on articles comprising applying liquid under pressure to an article provided initially with at least one curved surface to flex said surface, converting said liquid to a solid while said surface is flexed, generating a curved surface on said initially curved surface while it is flexed and thereafter removing said solid and restoring said article to an unflexed state.

12. A method of producing aspherical surfaces on articles according to claim 11 wherein said liquid is a molten low melting metal.

13. A method of producing aspherical surfaces on articles according to claim 11 wherein said liquid is a hardenable synthetic resin.

References Cited by the Examiner

UNITED STATES PATENTS

| | | | |
|---|---|---|---|
| 683,163 | 9/01 | Wideen. | |
| 1,911,153 | 5/33 | Hill | 51—284 |
| 2,187,105 | 1/40 | Tillyer | 51—284 |
| 2,263,249 | 11/41 | Rogers. | |
| 3,030,859 | 4/62 | Elliott | 51—284 |
| 3,064,401 | 11/62 | Mooney | 51—284 |
| 3,079,736 | 3/63 | Kratt. | |
| 3,079,737 | 3/63 | Kratt et al. | |
| 3,079,739 | 3/63 | Rawstron | 51—284 X |

FOREIGN PATENTS 449,319    6/49    Italy.

LESTER M. SWINGLE, Primary Examiner.

FRANK E. BAILEY, Examiner.